United States Patent [19]

Kamphorst

[11] 4,214,880

[45] Jul. 29, 1980

[54] LIQUID SEAL SYSTEM, E.G. FOR A FLARE STACK

[76] Inventor: Hendrik A. Kamphorst, Groeneweg 8, 1861 PH Bergen NH, Netherlands

[21] Appl. No.: 902,215

[22] Filed: May 2, 1978

[30] Foreign Application Priority Data

May 3, 1977 [GB] United Kingdom ............ 18467/77

[51] Int. Cl.$^2$ .................... B01D 47/02; B01D 45/12
[52] U.S. Cl. ........................... 55/204; 55/206; 55/256; 55/355
[58] Field of Search .............. 55/184, 204, 206, 235, 55/236, 237, 248, 255, 256, 355; 137/251–254

[56] References Cited

U.S. PATENT DOCUMENTS

| | | | |
|---|---|---|---|
| 2,167,839 | 8/1939 | Henderson et al. | 55/255 X |
| 2,259,033 | 10/1941 | Fisher | 55/235 X |
| 2,551,890 | 5/1951 | Love | 55/248 X |
| 2,612,745 | 10/1952 | Vecchio | 55/256 X |
| 3,314,220 | 4/1967 | Goldstein | 55/355 X |
| 3,331,194 | 7/1967 | Reed et al. | 55/256 X |
| 3,561,194 | 2/1971 | Baldwin et al. | 55/256 X |
| 3,901,643 | 8/1975 | Reed et al. | 431/202 |

FOREIGN PATENT DOCUMENTS

| | | | |
|---|---|---|---|
| 1910129 | 10/1969 | Fed. Rep. of Germany | 55/248 |
| 590894 | 6/1925 | France | 55/236 |
| 1111358 | 4/1968 | United Kingdom . | |
| 1158401 | 7/1969 | United Kingdom . | |
| 1159982 | 7/1969 | United Kingdom . | |
| 1333877 | 10/1973 | United Kingdom . | |
| 1412950 | 11/1975 | United Kingdom . | |
| 1433985 | 4/1976 | United Kingdom . | |

*Primary Examiner*—Robert H. Spitzer
*Attorney, Agent, or Firm*—Bard & Groves

[57] ABSTRACT

A liquid seal for isolating a source of unwanted gas from an outlet from where it is to be discharged. The seal is particularly for use at the bottom of a flare or vent stack and comprises a cylindrical housing comprising two liquid seals, one above the other. If the seals are arranged in parallel a high rate of flow of gas through the system is permitted without increasing the diameter of the cylinder beyond an unacceptable dimension. Alternatively, if the seals are arranged in series a greatly improved sealing action is obtained.

10 Claims, 4 Drawing Figures

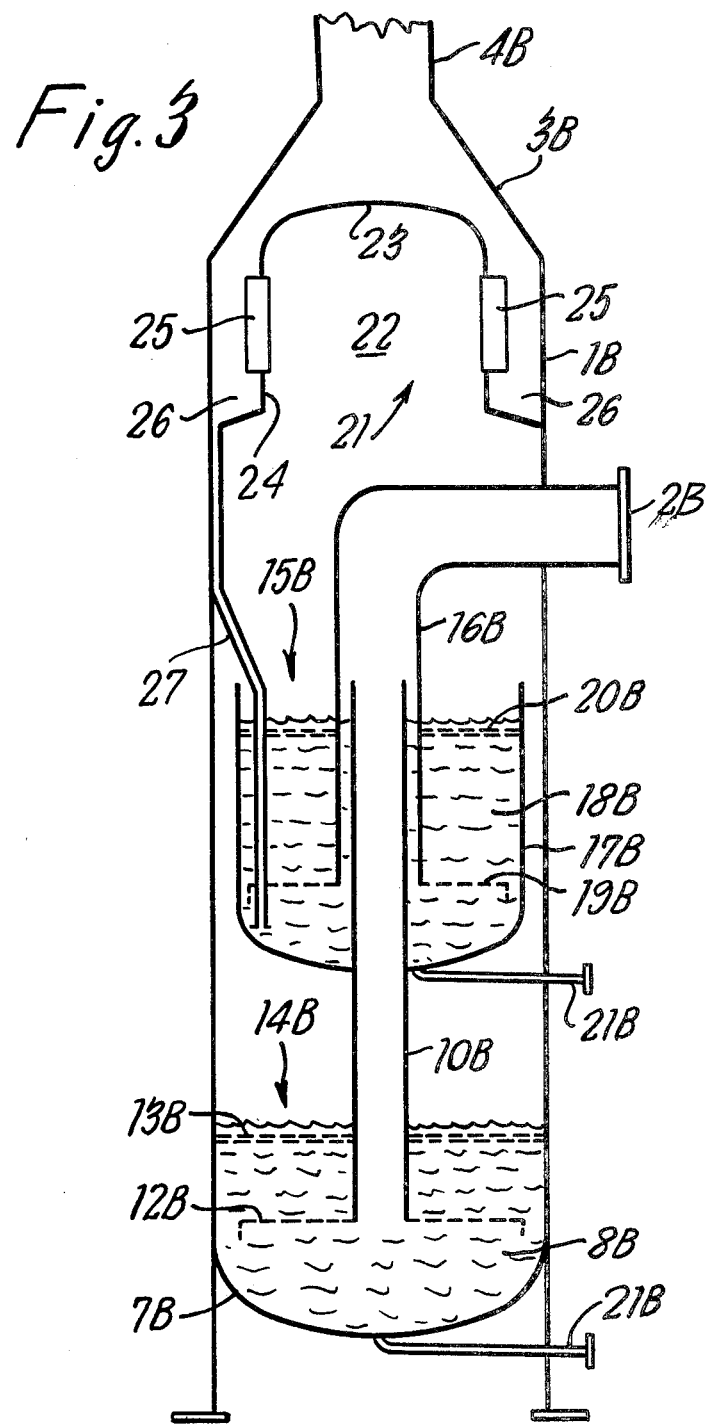

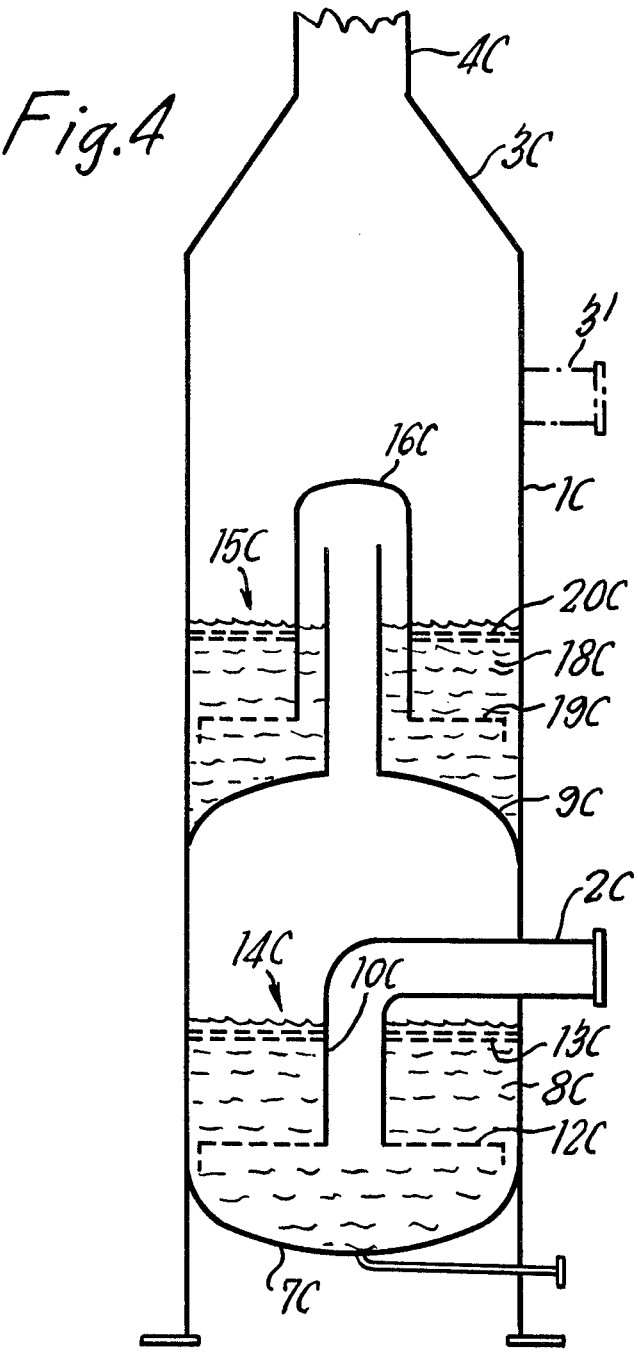

LIQUID SEAL SYSTEM, E.G. FOR A FLARE STACK

BACKGROUND OF THE INVENTION

This invention relates to a liquid seal system particularly, though not exclusively, for a flare and/or vent stack.

Flare and vent stacks are commonly used in the petroleum, chemical and petrochemical industry to dispose of combustible gases which either constitute waste material or which have had to be released to relieve excess pressure. These stacks are frequently provided with a liquid seal through which the gases pass. This is to prevent flame flashback, to prevent air from the outlet of the stack entering the feedback to the stack, and to maintain an above atmospheric pressure in the feedline leading to the stack. An above atmospheric pressure is needed to prevent any possibility of air entering the feedline through faulty connections or the like.

There are advantages in using a liquid sealing system having an outer casing in the form of a vertical drum located at the bottom of the stack and co-axial with it. One example of the advantages of this arrangement is that it facilitates free flow of the gases: an important consideration in designing these systems.

In order to avoid entrainment of the sealing liquid into the gases, the gas velocity through the seal should not exceed 5 feet per second. The speed of the gas in the seal depends on the volume per second fed to the seal and on the surface area of the liquid. The surface area, in turn, depends on the diameter of the base drum.

Unfortunately, it is impractical to increase the diameter beyond a certain size and so, hitherto, for very large rates of gas flow, a horizontal vessel has had to be used, mounted alongside the stack. An object of this invention is to avoid this problem. Another problem of existing seals is that their sealing ability is limited. In the case of very highly inflammable gases there may be some risk of flashback jumping across the seal. Another object of the invention is to reduce this problem.

SUMMARY OF THE INVENTION

According to the invention there is provided a liquid sealing system, e.g. for a flare of vent stack, comprising two or more liquid sealing devices one above the other and means for directing incoming gas through these sealing devices to a common outlet.

If the sealing devices are arranged in parallel the invention makes it possible to have an increased flow rate without increasing the diameter of the apparatus.

Alternatively the sealing devices may be arranged in series. This gives an improved sealing action and reduces the chances of a flashback bridging the sealing system.

The sealing system preferably includes a cylindrical housing which contains the sealing devices and has an inlet for the incoming gases, the common outlet being arranged at the top of the cylinder. In such an arrangement, when the sealing devices are in parallel, gas emerging from the lower sealing device or devices preferably passes upwardly towards the outlet between the wall of the cylindrical housing and the other sealing device or devices. The same cylinder may conveniently include a liquid separating drum upstream of one or more of the sealing devices to remove hydrocarbon condensates. Also a liquid separator may be included downstream of the sealing devices to remove any entrained sealing liquid and to return it to the sealing devices. In one suitable type of separator the gases are directed tangentially into an annular space where entrained liquids are removed by a centrifugal or cyclone action.

In one particular form of the invention each sealing device has its own inlet. The different inlets are connected to respective feed-pipes leading from different sources of gas. It is thus possible, by using different depths of liquid in the sealing devices to maintain different pressures in the feed-pipes. It is also possible to use different liquids for different types of waste gas. This is an advantage in some circumstances. For example a particular cold gas requires an aqueous solution containing an antifreeze. Also a solution containing a substance required for one gas might react unfavourably with another gas.

In another particular form of the invention a common inlet leads to each of the sealing devices. By, for example, arranging for different depths of liquid in the different sealing devices, one of these devices containing the lesser depth of liquid can be used under normal conditions whilst another is reserved for exceptional conditions: when there is a very high pressure of gas or when the other device becomes blocked (e.g. by freezing).

BRIEF DESCRIPTION OF THE DRAWINGS

FIG. 3 shows a sealing system comprising a single inlet, two sealing devices connected in parallel and a centrifugal separator downstream of the sealing devices; and FIG. 4 shows a sealing system comprising two sealing devices connected in series.

DESCRIPTION OF THE PREFERRED EMBODIMENTS

Figure 1:
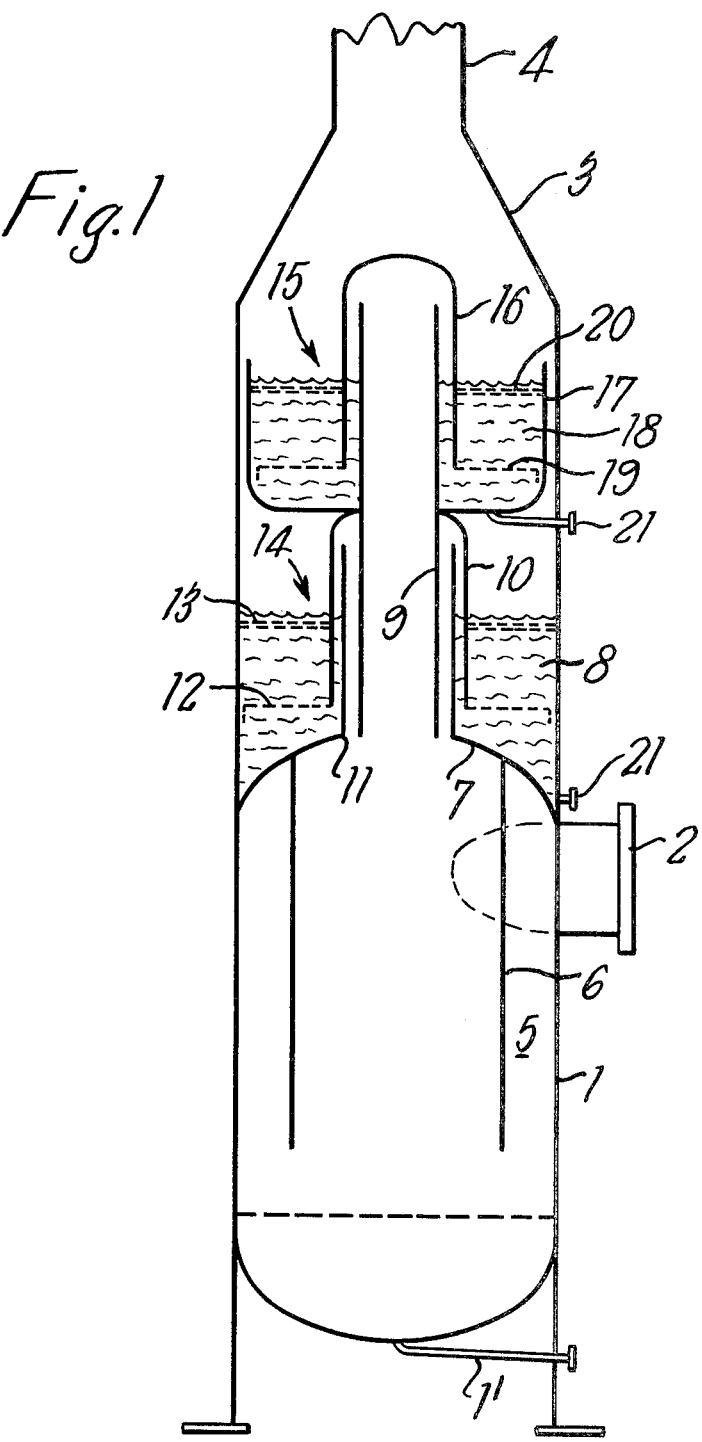
FIG. 1 shows a sealing system incorporating two parallel connected sealing devices having a single inlet and a centrifugal separator upstream of the sealing devices.

Referring first to FIG. 1 there is shown a sealing system especially designed to fit co-axially at the bottom of a flare stack whilst having the capacity to handle a large rate of flow of gas without entrainment of the sealing liquid.

The system of FIG. 1 comprising a cylinder 1 having a side inlet 2 and a top outlet 3 from which gases are directed to a flare stack 4, at the top of which they are burned. The stack 4 is co-axial with and supported by the cylinder 1. From the inlet 2 the gases are directed tangentially around an annular space 5 defined between the inner surface of the cylinder 1 and a sleeve 6. The resulting cyclone motion deposits any entrained liquid on the surface of cylinder 1 by centrifugal action and this liquid flows to the base of the cylinder 1 from where it is expelled through drain 1'. The components 1 and 6 in combination thus constitute a centrifugal separator.

The resulting liquid free gas rises through sleeve 6 and into a funnel shaped member 7 the outer rim of which is sealed to the interior surface of the cylinder 1 and supports a sealing liquid 8 above it.

The gas entering the stem of the funnel 7 is split into two parts respectively outside and inside a tube 9. The path of the gas outside the tube passes into the top of an inverted cup shaped member 10 whose bottom edge 11 is immersed in the liquid 8. The gas passes through this liquid in the form of bubbles and these bubbles are dispersed by a baffle 12. Another baffle 13 reduces waves or oscillations of the water surface. Thus the members 7, 10, 12 and 13 constitute a first liquid seal identified generally by reference numeral 14. The gas emerging from the water seal 14 passes upwardly between the wall of the cylinder 1 and a second water seal 15 defined by the tube 9, and inverted cup 16, a container 17 for liquid 18 and baffles 19 and 20. The gas emerging from the liquid 18 joins the gas from the separator 14, rising through an annular space between the cylinder 1 and the container 17. The gas is then expelled into the stack 4.

Drains 21 are provided for draining away expended sealing liquid.

Figure 2:
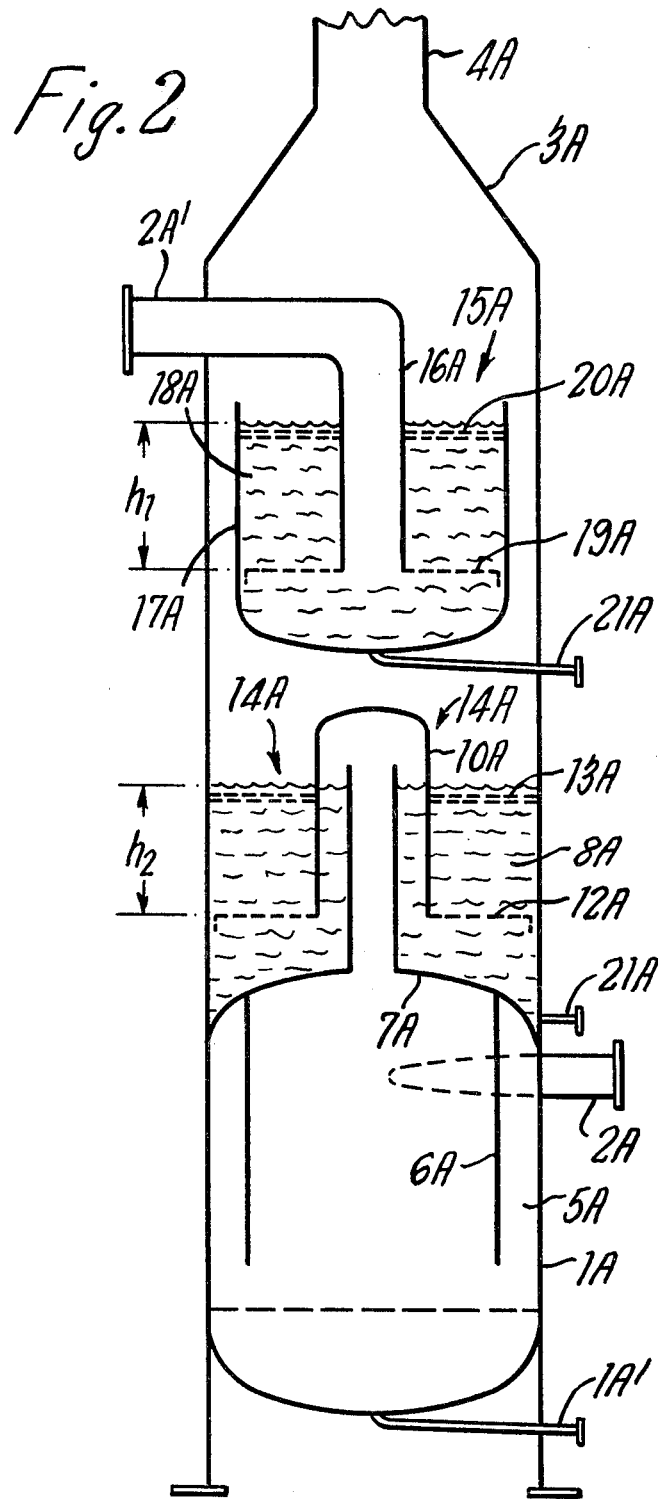
FIG. 2 shows a sealing system incorporating two separate inlets to two respective sealing devices connected in parallel and a centrifugal separator connected upstream of one of the sealing devices.

FIG. 2 shows an alternative system having separate inlets 2A, 2A' to separate liquid seals 14A and 15A respectively, enclosed within a cylindrical housing 1A. From the inlet 2A gas is directed tangentially around an annular space 5A defined between the inner surface of cylinder 1A and a sleeve 6A. The resulting cyclone action deposits entrained liquid on the surface of cylinder 1A and the deposited liquid flows to the base of the cylinder 1A from where it is expelled through a drain 1A'. The components 1A and 6A in combination thus constitute a centrifugal separator.

The resulting liquid free gas rises through the sleeve 6A into a funnel shaped member 7A the outer rim of which is sealed to the interior surface of the cylinder 1A and supports a sealing liquid 8A above it. At the top, narrow end of the member 7A the gas is forced downwardly, by an inverted cup shaped member 10A, through the liquid 8A. The gas bubbles through this liquid, the bubbles being dispersed by baffle 12A. Another baffle 13A reduces the size of waves or oscillations of the liquid surface. After passing through the liquid the gas rises through an annular space defined between the upper seal 15A and the cylinder 1A.

Gas enters the seal 15A through an inlet 2A'. The inlets 2A and 2A' may be connected to different gas sources, not shown. The inlet 2A' leads to a downpipe 16A whose lower end is submerged in sealing liquid 18A in a container 17A. The gas bubbles through the liquid 18A, being dispersed by a baffle 19A. The liquid surface is stabilized by another baffle 20A. After emerging from the liquid 18A the gas joins that from the seal 14A and is expelled through outlet 3A to the stack 4A. Drains 21A are provided for removing spent liquids 8A and 18A.

The device shown in FIG. 2 is of value when gas from different sources is required to be kept under different pressures. This is possible by choosing the heights $h_1$ and $h_2$ through which the gasses are bubbled so that the products $h_1 p_1$ and $h_2 p_2$ equal the required back pressure, where $p_1$ and $p_2$ are the respective densities of liquids 18A and 8A.

The device of FIG. 2 is also of value where gases from different sources have different objectionable components which have to be removed. The liquids 8A and 18A can be chosen so that they remove these components, e.g. by reacting chemically therewith.

FIG. 3 shows another alternative construction comprising a cylindrical casing 1B having two sealing devices 14B and 15B. Gas enters through an inlet 2B from which it is directed downwardly through a duct 16B. Part of the gas flowing down duct 16B enters another duct 10B the lower end of which dips into a liquid 8B held in a space defined by the cylinder 1B and a curved member 7B. The gas bubbles through the liquid 8B, being dispersed by a baffle 12B. The surface of the liquid 8B is stabilised by another baffle 13B. After emerging from the liquid 8B the gas passes through an annular space between the cylinder 1B and the upper of the two sealing devices 15B.

Another part of the gas entering through inlet 2B passes between the duct 10B and the downpipe 16B. This part of the gas bubbles through liquid 18B in a container 17B, being dispersed by baffle 19B. The surface of the liquid 18B is stabilized by another baffle 20B. The gas emerging from the liquid 18B mixes with the gas from the device 14B and passes to a centrifugal separator indicated generally at 21. This separator comprises a central space 22 into which the gases initially flow. This space 22 is limited at its upper end by a wall 23 and is surrounded by a tubular wall 24. The space 22 is open at its bottom end to receive the gases from sealing devices 14B and 15B. The tubular wall 24 has, spaced around its circumference, baffles 25 arranged at an acute angle to the radial direction so as to direct the gases around an annular space 26 defined between the wall 24 and the cylinder 1B. Because of the rotational movement of the gases around the space 26 any entrained liquids are deposited on the inner wall of the cylinder 1B from where they drain to the container 17B through a duct 27. The resulting liquid free gases are expelled through an outlet 3B to a stack 4B. Drains 21B are provided for removing spent liquids 8B and 18B.

In the systems which have been described so far the individual sealing devices are connected in parallel in order to give the advantage of a relatively large surface area of liquid and therefore capacity to handle a large rate of flow of gas. However it is, in an alternative arrangement, possible to have the individual sealing devices connected in series. This is useful where highly inflammable gases are being handled to give extra security against flashback. One possible device is shown in FIG. 4.

Referring to FIG. 4 the sealing device comprises a vertical cylindrical housing 1C containing two sealing devices 14C and 15C connected in series. Gas enters through an inlet 2C and is directed through a downpipe 10C, the lower end of which is emersed in a liquid 8C. The latter is contained within a container defined by the wall of the cylinder 1C and a floor 7C. The gas bubbles through the liquid 8C, being dispersed by a baffle 12C and the surface of the liquid 8C is stabilized by another baffle 13C.

The gas emerging from the sealing device 14C is directed to the centre of the cylinder by a funnel shaped member 9C from where it issues into the top of an inverted cup shaped member 16C. The member 9C cooperates with the cylinder 1C to form a space for containing sealing liquid 18C. The lower, open, end of the member 16C is submerged in the liquid 18C thereby forcing the gas to bubble through this liquid. The bubbles are dispersed by a baffle 19C and the surface of the liquid 18C is stabilised by another baffle 20C. The gas then passes through an outlet 3C into a stack 4C. In an alternative construction the gas can be made to pass out of the cylinder 1C through an outlet 3' illustrated in broken lines on FIG. 4.

Variations on the devices illustrated in FIGS. 1 to 4 are possible. For example, though the invention was particularly devised for use in connection with a flare and/or vent stack it could be applied to other systems such as incinerator systems. Such incinerator systems are used for disposing of highly inflammable waste gases, e.g. at terminals where tanks for carrying inflammable liquid such as gasoline are loaded.

I claim:

1. A stack for venting and firing a combustible gas comprising a chimney portion and a columnar base portion, the base portion being formed as a hollow supporting structure for the chimney portion, with an interior columnar chamber, there being located in the columnar chamber a liquid sealing system comprising at least two liquid sealing devices utilizing separate respective bodies of liquid, disposed one above the other and each having a surface extending substantially across the whole width of the chamber, means for directing incoming gas through the sealing devices into the chimney portion, a common inlet, the inlet communicating with inner and outer co-axial ducts centrally located along the axis of the chamber, the outer duct leading to the first sealing device closest to the inlet and the inner duct leading centrally through the first sealing device to the second sealing device, the first sealing device being above the second, the outer co-axial duct leading vertically into the liquid of the first sealing device and the inner co-axial duct leading from a level above the liquid level of the first sealing device directly into the liquid of the second sealing device.

2. A stack in accordance with claim 1 wherein the sealing devices are arranged in parallel.

3. A stack in accordance with claim 1 wherein the sealing devices are arranged in series.

4. A stack in accordance with claim 1 wherein the chamber is cylindrical and wherein paths for the gas extend from each sealing device into the chimney co-axially with the chamber.

5. A stack in accordance with claim 1 wherein the sealing devices are arranged in parallel and wherein a path for the gas extends from one sealing device upwardly towards the chimney between the cylindrical housing and the other sealing device.

6. A stack in accordance with claim 1 which includes a separating device upstream of at least one of the sealing devices for removing liquid particles entrained with the gas.

7. A stack in accordance with claim 1 which includes a separating device downstream of the sealing device for removing liquid entrained with the gas.

8. A stack in accordance with claim 1 including a centrifugal separator for removing liquid entrained with the gas.

9. A stack in accordance with claim 1 wherein each said device has its own inlet so that gaseous products from different sources pass through respective sealing devices.

10. A stack in accordance with claim 1 wherein the inlet leads to a centrifugal separator in the bottom region of the chamber, the said co-axial ducts leading upwardly out of the chamber, each of the inner and outer co-axial ducts communicating with a cup-shaped member having a bottom edge immersed in the liquid of a said sealing device.